April 21, 1931.  R. H. IMHOFE ET AL  1,802,257
DRAW BAR CONSTRUCTION
Filed March 26, 1930
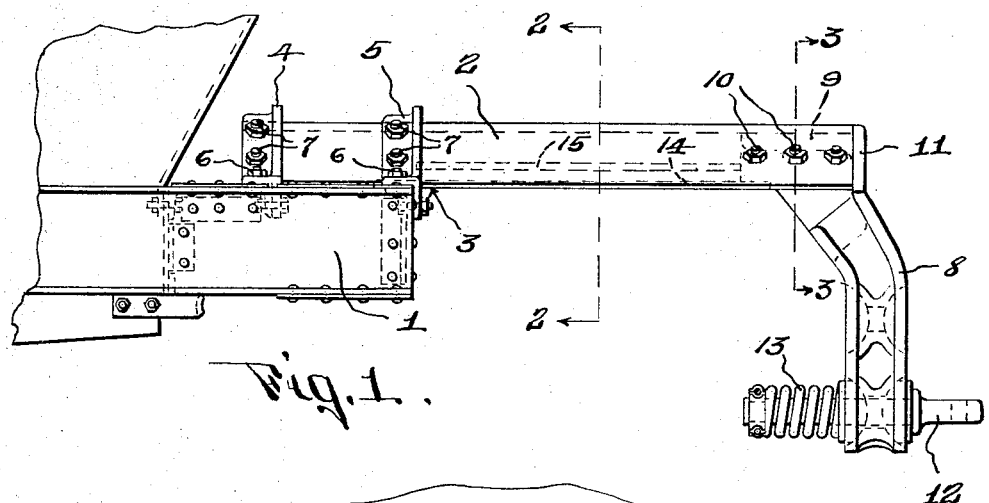
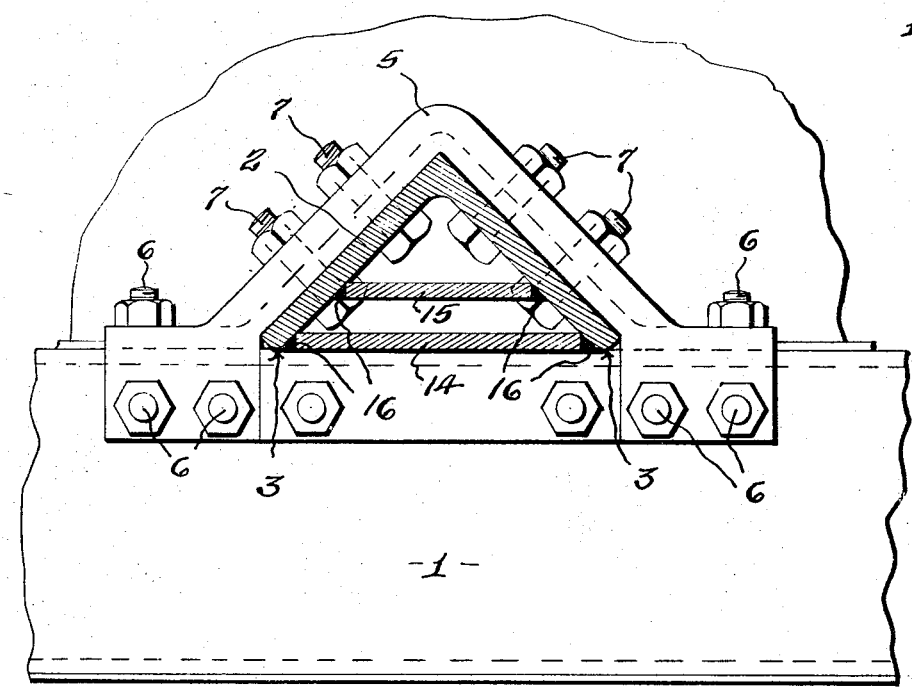
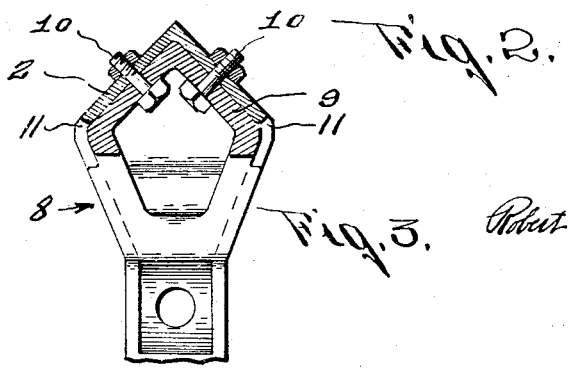
INVENTORS.
Robert H. Imhofe and Alonzo L. Humphrey
BY
Pradell & Thompson
ATTORNEYS.

Patented Apr. 21, 1931

1,802,257

UNITED STATES PATENT OFFICE

ROBERT H. IMHOFE AND ALONZO L. HUMPHREY, OF CANASTOTA, NEW YORK, ASSIGNORS TO REX-WATSON CORPORATION, OF CANASTOTA, NEW YORK, A CORPORATION OF NEW YORK

DRAWBAR CONSTRUCTION

Application filed March 26, 1930. Serial No. 439,233.

This invention has for its object a particularly simple, economical and strong construction for draw bars, particularly draw bars for trailers, or so-called semi-trailers.

The invention consists in the novel features and in the combinations and constructions hereinafter set forth and claimed.

In describing this invention, reference is had to the accompanying drawing, in which like characters designate corresponding parts in all the views.

Figure 1 is an elevation of this draw bar showing the same attached to the frame of a trailer.

Figures 2 and 3 are enlarged, sectional views on lines 2—2 and 3—3, respectively, Figure 1.

This draw bar construction comprises generally, an angle iron bar secured at its inner end to the vehicle frame and having a draw head at its outer end, said bar being arranged with its open side down and its apex portion up, and means for securing the inner end of the draw bar to the vehicle frame, and means for securing the draw head to the outer end of the bar, the latter means including a portion nested in the angle or channel of the angle iron bar.

1 designates the frame of a trailer vehicle of any suitable construction.

2 is a draw bar angular in cross section, it being here shown as right angular in cross section and arranged with its open side down and its apex up, although it will be understood that the invention is not limited to a right angular angle bar. The rear end of the bar 2 overlaps the frame 1 of the vehicle, and the edges 3 of the bar 2 rest upon suitable cross bars of the vehicle frame 1.

As here illustrated, the rear end of the bar 2 is secured to the vehicle frame 1 by spaced apart eye members 4, 5 having eyes or openings as triangular openings therein for conforming to the angle iron 2, and said members 4, 5 are secured to the frame of the vehicle in any suitable manner as by bolts 6 and to the bar by fastening members as bolts 7 extending through the flanges of the angle iron bar 2, and the portions of the members 4, 5 embracing the bar 2.

8 designates the draw head which is usually an arm depending from the front end of the bar 2 and having a portion 9 nested in the channel or angle of the bar 2 and secured therein in any suitable manner as by bolts 10. Also, the draw head is provided with a shoulder 11 abutting against the front end edge of the bar 2.

A draw link 12 is slidably mounted in the lower end of the draw head 8, this working against a suitable spring 13.

The bar 2 is provided with one or more reinforcing plates 14, 15 within the same and extending lengthwise thereof, these being integrally secured as by welding 16 to the flanges or opposing walls of the bar 2. The plate 14 is arranged at the extreme lower edges of the flanges of the bar 2, so that the bar is for the most part in the form of a hollow triangle. The plate 14 extends from the inner or rear end of the bar 2 to the portion 9 of the draw head nested in the channel of the draw bar 2, while the plate 15 extends from the foremost member 5 to the portion of the draw bar within the channel of the bar 2.

Owing to this construction, the draw bar is particularly strong and firmly secured to the vehicle, and it will be noted that owing to the relative arrangement of the draw head 8 and the bar, the pulling force applied to the lower end of the draw head 8 also applies an upward force to the draw bar 2. Owing to the relative arrangement of the fastening members 4, 5, the webs or plates 14, 15 and the nesting of the draw head 8 in the bar 2 and the thrusting of the shoulder 11 against the ends of the draw bar, the bar 2 is firmly braced against all pulling and bending strains applied to it.

What we claim is:

1. A draw bar construction for vehicles comprising an angle iron bar secured at its inner end to the vehicle frame and having a draw head at its outer end, said bar being arranged with its open side down and with its apex portion up, and means for securing the inner end of the bar to the frame comprising a member having an opening for fitting the bar.

2. A draw bar construction for vehicles comprising an angle iron bar secured at its inner end to the vehicle frame and having a draw head at its outer end, said bar being arranged with its open side down and with its apex portion up, and means for securing the inner end of the bar to the frame comprising a pair of spaced apart members having openings fitting the bar, and fastening means securing said bar to said members.

3. A draw bar construction for vehicles comprising an angle iron bar secured at its inner end to the vehicle frame and having a draw head at its outer end, said bar being arranged with its open side down and its apex portion up, and means for securing the inner end of the draw bar to the frame, said draw head depending from the front end of the bar and having a portion nested in the channel of the bar and secured thereto.

4. A draw bar construction for vehicles comprising an angle iron bar secured at its inner end to the vehicle frame and having a draw head at its outer end, said bar being arranged with its open side down and its apex portion up, and means for securing the inner end of the draw bar to the frame, said draw head depending from the front end of the bar and having a portion nested in the channel of the bar and secured thereto, and also having a shoulder thrusting against the front end of the bar.

5. A draw bar construction for vehicles comprising an angle iron bar secured at its inner end to the vehicle frame and having a draw head at its outer end, said bar being arranged with its open side down and with its apex portion up, and means for securing the inner end of the bar to the frame comprising a member having an opening for fitting the bar, said draw head having a portion nested in the front end of the bar and secured thereto, and a shoulder thrusting against the front end of the bar.

6. A draw bar construction for vehicles comprising an angle iron bar secured at its inner end to the vehicle frame and having a draw head at its outer end, said bar being right angular in cross section and arranged with its apex portion upward, and means for securing the inner end of the bar to the frame comprising a member formed with a triangular opening for receiving the inner end of the bar.

7. A draw bar construction for vehicles comprising an angle iron bar secured at its inner end to the vehicle frame and having a draw head at its outer end, said bar being arranged with its open side down and its apex portion up, a transverse brace plate in the channel of the bar between the opposite flanges of the angle bar and integrally secured at its edges to the bar.

8. A draw bar construction for vehicles comprising an angle iron bar secured at its inner end to the vehicle frame and having a draw head at its outer end, said bar being arranged with its open side down and its apex portion up, a plurality of brace plates arranged in the space enclosed by the bar and integrally secured at their side edges to the flanges of the bar.

9. A draw bar construction for vehicles comprising an angle iron bar secured at its inner end to the vehicle frame and having a draw head at its outer end, said bar being arranged with its open side down and its apex portion up, a transverse brace plate between the opposite flanges of the bar and integrally secured at its edges to the flanges of the bar, the draw head having a portion nested in the front portion of the bar and secured thereto, said brace plate extending lengthwise of the bar and abutting against said portion of the draw head nested in the bar.

10. A draw bar construction for vehicles comprising an angle iron bar secured at its inner end to the vehicle frame and having a draw head at its outer end, said bar being right angular in cross section and arranged with its open side down and its apex portion up, means for securing the bar to the vehicle frame comprising a member formed with a triangular opening fitting the bar, and means for securing the bar in said opening, a draw head depending from the outer end of the bar and having a portion nested and secured in the front portion of the bar, and a shoulder abutting against the front end of the bar.

11. A draw bar construction for vehicles comprising an angle iron bar secured at its inner end to the vehicle frame and having a draw head at its outer end, said bar being right angular in cross section and arranged with its open side down and its apex portion up, means for securing the bar to the vehicle frame comprising spaced apart members formed with triangular openings fitting the bar, and means for securing the bar in said openings, a draw head depending from the outer end of the bar and having a portion nested and secured in the front portion of the bar, and a shoulder abutting against the front end of the bar, and a brace plate located within the bar and extending lengthwise thereof and integrally secured at its margins to the side flanges of the bar.

In testimony whereof, we have hereunto signed our names, at Canastota, in the county of Madison and State of New York, this 18th day of March, 1930.

ROBERT H. IMHOFE.
ALONZO L. HUMPHREY.